United States Patent [19]

Schlapp et al.

[11] Patent Number: 4,504,134
[45] Date of Patent: Mar. 12, 1985

[54] PHOTOGRAPHIC OBJECTIVE WITH AUTOMATIC DIAPHRAGM

[75] Inventors: Werner Schlapp, Asslar; Werner Wiessner, Wetzlar, both of Fed. Rep. of Germany

[73] Assignee: Ernst Leitz Wetzlar GmbH, Wetzlar, Fed. Rep. of Germany

[21] Appl. No.: 538,967

[22] Filed: Oct. 4, 1983

[30] Foreign Application Priority Data

Oct. 6, 1982 [DE] Fed. Rep. of Germany ....... 3236958

[51] Int. Cl.³ .................................................. G03B 9/07
[52] U.S. Cl. .................................... 354/272; 354/152; 354/274
[58] Field of Search ................ 354/152, 270, 272, 274

[56] References Cited

U.S. PATENT DOCUMENTS

| 3,298,295 | 1/1967 | Schlapp | 354/274 |
| 3,864,714 | 2/1975 | Sasaki | 354/272 |
| 4,319,824 | 3/1982 | Rossmann | 354/272 |
| 4,411,510 | 10/1983 | Faatz et al. | 354/272 |

Primary Examiner—A. A. Mathews
Attorney, Agent, or Firm—Schwartz, Jeffery, Schwaab, Mack, Blumenthal & Koch

[57] ABSTRACT

A compensating mechanism is provided on the leaf guide ring of a photographic objective for single-lens mirror reflex camera which opens to its largest value after a picture is taken in response to the hinge motion of the camera reflex mirror. The mechanism compensates for the advance of the diaphragm control lever on the camera side controlled by the reflex mirror.

6 Claims, 2 Drawing Figures

PHOTOGRAPHIC OBJECTIVE WITH AUTOMATIC DIAPHRAGM

BACKGROUND OF THE INVENTION

The present invention relates to a photographic objective for single-lens mirror reflex cameras with a preselector iris system and with an automatic diaphragm comprising a spacially fixed leaf support ring supporting the diaphragm leaves as well as a leaf guide ring rotatable relative to the leaf support ring, and wherein, after a picture is taken, the automatic diaphragm opens to its largest value depending on the hinge motion of the reflex mirror.

After a picture has been taken, the reflex mirror performs an advance, that is a motion larger than required for opening the diaphragm to the full value. The advance assures that the hinge motion of the reflex mirror is sufficient to reach the largest opening value of each objective employed with the mirror reflex camera. The advance has to be compensated for in order to avoid damage occurring in the region of the diaphragm.

In order to compensate for the advance, it is known to provide the guide grooves of the leaf guide ring such that, on one hand, they cause a rapid closing of the diaphragm and, on the other hand, they effect little or no further motion of the diaphragm leaves after the leaves reach the largest opening which could be achieved under control of the diaphragm lever on the side of the camera. Such overflow curves at guide grooves can only be realized with objectives having a short or average focusing length without resulting in disadvantages relative to delays in the closing of the diaphragm. In contrast, objectives with longer focusing lengths and with openings relatively large with respect to this are furnished with leaf guide rings. The guide grooves of the leaf guide rings in fact allow a rapid closing of the diaphragm before the start of the camera shutter operating cycle, but they permit a compensation of the advance of the reflex mirror only under certain technical preconditions.

SUMMARY OF THE INVENTION

An object of the present invention is to provide a photographic objective for a single-lens mirror reflex camera which compensates for the reflex mirror advance.

Another object of the present invention is to provide a photographic objective with compensation for the mirror advance in which the compensation is effected relatively inexpensively and without using overflow curves following the guide grooves.

In accordance with the above and other objects, the present invention is a photographic objective provided with means on the leaf guide ring by way of which the advance of the diaphragm control lever on the camera side controlled by the reflex mirror is compensated.

The photographic objective comprises a diaphragm preset system and an automatic diaphragm. The automatic diaphragm comprises iris blades, a spacially fixed leaf support ring supporting the iris blades and a leaf guide ring rotatable relative to the leaf support ring. The automatic diaphragm is adapted to open to its largest possible value after a picture is taken in response to motion of the reflex mirror transmitted through a diaphragm control lever. A compensating structure is connected to the leaf guide ring for compensating for an advance of the diaphragm control lever whereby after the diaphragm control lever has moved sufficiently to cause the automatic diaphragm to open to its largest possible value, further motion of the diaphragm control lever does not affect the automatic diaphragm.

In accordance with other aspects of the invention, the diaphragm control lever directly engages the compensating structure.

The compensating structure may comprise a tiltable rocking lever mounted to turn about an axis attached to the leaf guide ring, and a spring attached to bias the rocking lever. The rocking lever is rotated against the spring bias in response to the advance.

The automatic diaphragm includes a spring connected to bias the automatic diaphragm to a closed position. The spring force of the spring connected to said tiltable lever is greater than the spring force of the spring closing the automatic diaphragm.

BRIEF DESCRIPTION OF THE DRAWINGS

The above and other objects will become more readily apparent as the invention becomes more fully understood in connection with the detailed description to follow, reference being had to the accompanying drawings in which like reference numerals represent like parts throughout, and which.

DETAILED DESCRIPTION OF THE PREFERRED EMBODIMENT

Figure 1:
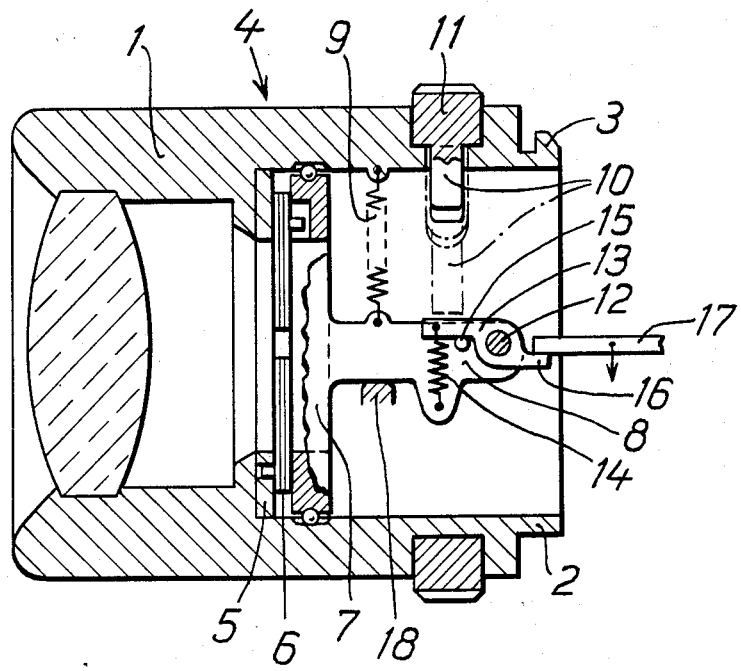
FIG. 1 is a side elevational sectional view of the tube body of a photographic objective.
Figure 2:
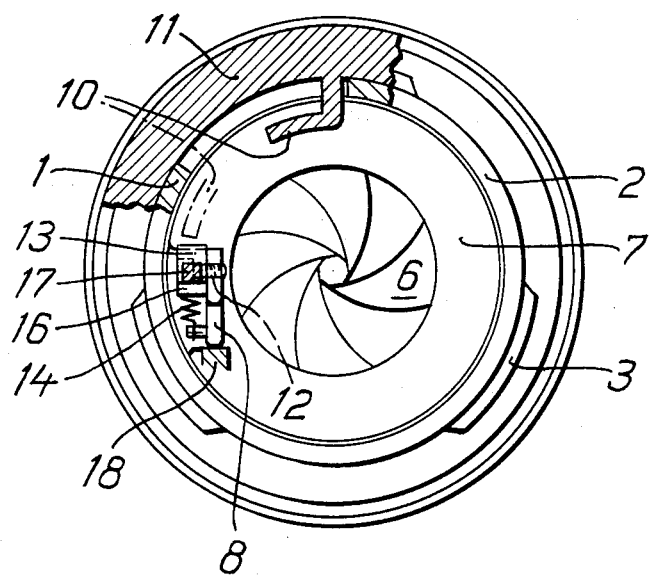
FIG. 2 is a rear part fragmentary view of the tube body according to FIG. 1.

A tube body 1 of a photographic objective, schematically shown in FIG. 1, can be attached with a bayonet 3 disposed at its rear end 2 to a single-lens mirror reflex camera (not shown).

An automatic diaphragm 4 is disposed in the tube body 1. The automatic diaphragm comprises a spacially fixed leaf support ring 5, diaphragm blades 6 supported at the ring 5, and a leaf guide ring 7 rotatable relative to the leaf support ring 5. The automatic diaphragm 4 opens and closes in a known manner by tilting the diaphragm blades 6 upon a relative rotation between the leaf support ring 5 and the leaf guide ring 7.

The automatic diaphragm 4 is maintained at a selected opening diameter by a tension spring 9 attached between the tube body 1 and a diaphragm catch 8. Catch 8 is formed integrally in a single piece with the leaf guide ring 7. The size of the opening diameter is determined by a stop 10 of a diaphragm stop ring 11 disposed on the outer circumference of the tube body 1. At the selected opening, the diaphragm catch 8 is held against the diaphragm stop ring 11 by tension spring 9.

A rocking lever 13 is tiltable around an axis 12 attached to the diaphragm catch 8. Rocking lever 13 is positioned at the end of the diaphragm catch 8 disposed closest the mirror reflex camera. The rocking lever 13 is pulled by a tension spring 14 against a stop 15 on the diaphragm catch 8. As would be apparent to one of ordinary skill in the art, the tension spring 14 can be replaced by other biasing devices, such as a torsion spring acting on the rocking lever 13 and placed around the axis 12. The force of the spring acting on the rocking lever 13 is designed to be larger than the force of the spring 9 closing the automatic diaphragm 4.

A diaphragm control lever 17 engages the free end 16 of the rocking lever 13. The diaphragm control lever 17 is mechanically linked to the hinge mirror of the mirror reflex camera (not shown) to transmit force from the hinge mirror to the automatic diaphragm 4. The relative motion between the leaf support ring 5 and the leaf guide ring 7 is effected via the hinge motion of the reflex mirror through diaphragm control lever 17 after a picture has been taken. The diaphragm catch 8 contacts a stop 18 after reaching the largest diaphragm opening. The advance of the diaphragm control lever is now compensated by lifting the rocking lever 13 from the stop 15 against the force of the spring 14 and by turning the rocking lever around the axis 12 while maintaining the force transmitting coupling between the diaphragm control lever 17 and the free end 16 of the rocking lever 13.

The foregoing description is presented to illustrate the present invention but is not deemed to limit the scope thereof. Clearly, numerous modifications can be made to the invention without departing from the scope thereof as defined in the appended claims.

What is claimed is:

1. Photographic objective for a single-lens mirror reflex camera having a reflex mirror and a diaphragm control lever for transmitting force from said reflex mirror to said objective, said objective comprising:
   a diaphragm preset system;
   an automatic diaphragm comprising:
     iris blades;
     a spacially fixed leaf support ring supporting said iris blades; and
     a leaf guide ring rotatable relative to the leaf support ring, said automatic diaphragm being adapted to open to its largest possible value after a picture is taken in response to motion of the reflex mirror transmitted through said diaphragm control lever; and
   means connected to said leaf guide ring for compensating for an advance of said diaphragm control lever whereby after said diaphragm control lever has moved sufficiently to cause said automatic diaphragm to open to its largest possible value, further motion of said diaphragm control lever does not affect said automatic diaphragm.

2. Photographic objective according to claim 1, wherein said diaphragm control lever directly engages said compensating means.

3. Photographic objective according to claim 1, wherein said compensating means comprises a tiltable rocking lever mounted to turn about an axis attached to said leaf guide ring, and a spring attached to bias said rocking lever, said rocking lever being rotated against said spring bias in response to said advance.

4. Photographic objective according to claim 2, wherein said compensating means comprises a tiltable rocking lever mounted to turn about an axis attached to said leaf guide ring and a spring attached to bias said rocking lever, said rocking lever being rotated against said spring bias in response to said advance.

5. Photographic objective according to claim 3, wherein said automatic diaphragm includes a spring connected to bias said automatic diaphragm to a closed position, and the spring force of the spring connected to said tiltable lever is greater than the spring force of the spring closing the automatic diaphragm.

6. Photographic objective according to claim 4, wherein said automatic diaphragm includes a spring connected to bias said automatic diaphragm to a closed position, and the spring force of the spring connected to said tiltable lever is greater than the spring force of the spring closing the automatic diaphragm.

* * * * *